UNITED STATES PATENT OFFICE.

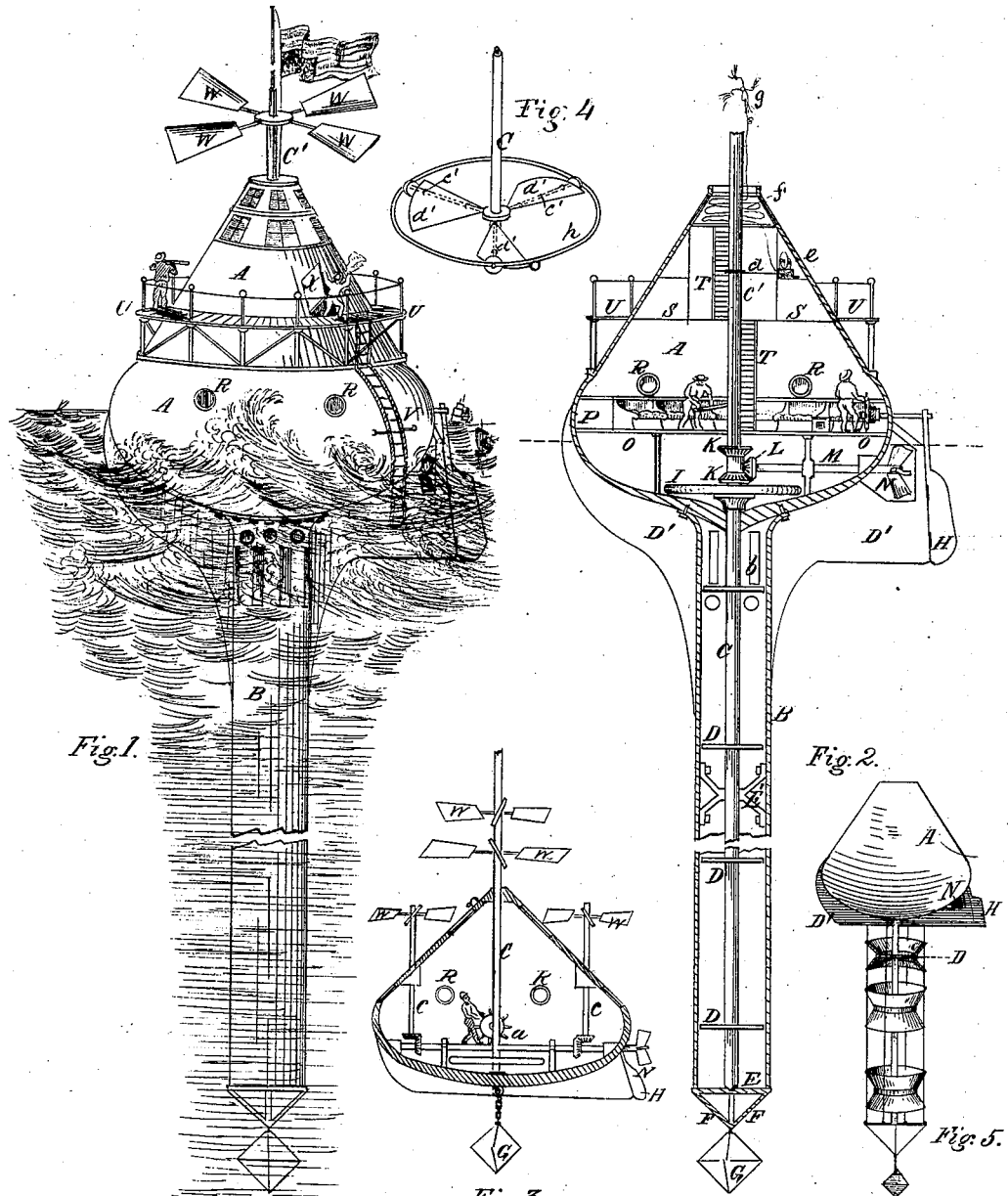

DAVID G. HASKINS, OF CAMBRIDGE, MASSACHUSETTS.

IMPROVEMENT IN LIFE-BOATS.

Specification forming part of Letters Patent No. 206,447, dated July 30, 1878; application filed May 20, 1878.

*To all whom it may concern:*

Be it known that I, DAVID GREENE HASKINS, of Cambridge, in the county of Middlesex and State of Massachusetts, have invented an Improved Life and Signal Boat, of which the following is a specification:

The object of my invention is to provide an efficient means for preserving life and property at sea in case of shipwreck, and also for giving light and sound in a signal-buoy to be anchored or placed at or near any dangerous places at sea or on the sea-coast.

The invention consists, mainly, of a floating vessel made somewhat in the form of an inverted balloon, and having a shaft extending vertically through its center down through its bottom to a depth of twenty feet, more or less, and also extending through the top of the vessel. Upon the vertical shaft, below the bottom of the vessel, are placed horizontal blades or wings, so constructed and arranged that by the action of the water, as the vessel moves up and down in the water, they will always rotate in one and the same direction, and consequently turn the shaft to which they are attached. Upon this shaft, in the lower part of the vessel, are two bevel-gear wheels attached to a sleeve capable of sliding up and down on the said shaft, the said wheels engaging with a gear-wheel on a horizontal shaft that extends out through the side of the vessel, and has attached to its outer end a propeller.

To the bottom of the vessel is attached a cylinder of a diameter sufficiently large to admit of the free rotation of the blades or wings which are attached to the shaft that passes down through the said cylinder, and is supported on cross-bars at the bottom of the cylinder. A weight is attached to the lower end of the cylinder to aid in maintaining the vessel in a vertical position. A fly-wheel is arranged on the shaft inside the bottom of the boat. The cylinder is open at the bottom, and is provided with openings at the upper end to admit of the free passage of water through the cylinder.

The power that actuates the rotating blades is due to the rising and falling of the vessel or buoy on the surface waves. The water at sea, as is well known, at a depth equal to the height of the waves, is practically still, and consequently a column of water inclosed in a vertical cylinder would remain at the mean surface-level, so that if such a cylinder were attached to a float rising and falling with the surface waves it would rise and fall around the inclosed column of water as upon a fixed piston. As the boat or vessel sinks in the trough of the sea the water is forced out through the openings at the top of the cylinder, and as it again rises to the crest of the waves the water rushes in again at the upper openings, and thus a constant motion is imparted to the inclosed fan-blades and shaft.

The portion of the vertical shaft projecting through the top of the vessel is provided with blades or wings similar to those on the lower part of the shaft, but to be acted upon by the wind, and thus serve as an auxiliary power to act upon the propeller-shaft.

Referring to the drawings, Figure 1 represents a perspective view of a vessel or buoy embodying my invention. Fig. 2 is a vertical section of the same. Fig. 3 is a modification of the vessel or buoy. Fig. 4 is a view of the hinged blades attached to the vertical shaft. Fig. 5 is a modification of the method of inclosing the shaft below the vessel.

A represents the float or vessel, to be made of the general shape shown, and constructed of plates of wrought-iron or of wooden staves properly bound and secured together.

B is a cylinder firmly attached to the bottom of the vessel A, and extending downward some twenty feet, more or less. It is open at the lower end, and at the upper end is provided with openings, as shown in Fig. 2.

D' D' represent a keel extending across the bottom of the boat, so as to admit of its being steered, and also serving as a stay to the cylinder B. A rudder, H, is also provided, and connected with a steering apparatus inside the boat.

A weight, G, is attached to the lower end of the cylinder, to aid in maintaining the boat in a vertical position.

Through the center of the vessel passes a vertical shaft, C, which extends down through the bottom of the boat to a depth of twenty feet, more or less, being supported at its lower end upon cross-bars E in the lower end of the cylinder by which it is surrounded. Braces E' may be placed within the cylinder to steady the shaft.

Upon the shaft C are secured a series of blades or wings, d', as shown in Fig. 4, which are hinged or pivoted to rods c', extending from the shaft C. The blades d', when acted upon by the water impinging against them in either direction, will always rotate in one and the same direction, as fully described in an application for a patent for the same now before the Office. The rotation of the blades imparts motion to the shaft C, with which they are connected, and consequently to propeller-shaft M.

On the shaft C, near the bottom of the boat inside, is a fly-wheel, I, and on the same shaft are also two bevel-gear wheels attached to a sleeve on the shaft, so as to enable either the upper or lower gear to engage with a corresponding bevel-gear, L, on the horizontal shaft M, that passes through the side of the boat, and has upon its outer end a propeller, N, as shown in Fig. 2. The bevel-gears K K are caused to turn with the shaft C, and may be made to engage with the gear L on shaft M alternately, as required, so as to reverse the propeller when necessary.

O is the main floor or deck of the cabin, and around the sides of the cabin are arranged berths P, with seats in front, as shown.

The space below the main deck or floor is for the storage of provisions, water, &c. In the sides of the vessel are windows R R, properly protected.

S is an upper floor or deck, to which access is had by means of a ladder or steps, T.

On the outside of the vessel, at a level with the upper deck, is a platform, U, extending around the sides of the vessel, and provided with a railing, as shown. From this platform a ladder, V, extends to the water-level of the boat. In the upper portion of the vessel is a door or man-hole, X.

The extreme upper portion of the vessel is to be provided with skylights, as shown in Fig. 1.

The main shaft C extends upward through the top of the vessel, and is provided with a series of rotating blades, which are actuated by the wind, and operate similarly to those on the lower end of the shaft, serving as auxiliary motors to the same.

Under some circumstances the cylinder B may be dispensed with, and the blades D upon the shaft C be exposed to the action of the water without being confined within the cylinder.

Fig. 3 represents a modification of my invention, showing a vessel designed for use in shallow water, or where it is likely to be landed upon the beach.

The weight G is attached to a chain which passes through a tube extending up into the vessel to a point above the level of the water, and may be drawn up or let down by a windlass. The weight may be attached to the chain by a detachable device, so that it can be dropped off in case of necessity. Auxiliary vertical shafts c c, provided with wind-blades W W, may be used for imparting additional power to the propeller-shaft, if desirable.

In the upper portion of the vessel is arranged a rotary electrical apparatus, e, Fig. 2, to which motion is imparted by means of an endless band, d, passing around a wheel or pulley on the main shaft. A conducting-wire extends upward in a coil, which may be either inside or outside the lantern-top, and, passing out, terminates in luminous rotating points g.

Connected with and placed below the electrical apparatus, and separated from it by a partition of metal, which may or may not be perforated, is a box or chamber in which heat is to be generated by friction, which is effected by means of metallic bars attached to a small vertical shaft rotated by connection with the main shaft C', and made to pass in their revolution through fragments of metal or other suitable material placed in the frictional chamber. The purpose of the frictional chamber is to render the air dry and favorable for the working of the electrical apparatus, the latter being designed to furnish a signal-light. It is also intended to connect with the shaft a rotary blower, to be connected with pipes or tubes for supplying the vessel with fresh air and exhausting foul air. A rotary pump may also be arranged to be operated by the shaft for pumping out water, if necessary.

Rotating bars may be arranged to strike a bell or gong as a sound-signal.

As a further means for providing for the ventilation of the vessel, I propose to use tubes or pipes which enter the vessel near the upper part and extending downward on the outside a little below the level of the water, and provided with perforations for the admission of air, so that by the rising and falling of the vessel air will be drawn in and out.

Instead of a cylindrical inclosure, B, a series of double reversed truncated cones may be used, as shown in Fig. 5, the sectoral blades being arranged at the plane of junction of the two double cones, the object being to cause the water to impinge with greater force upon the sectoral blades. These double-truncated cones are supported by rods extending downward from the vessel.

What I claim as my invention is—

1. A boat or vessel provided with a propeller to which motion is imparted by means of a series of rotating hinged blades or wings attached to a shaft and actuated by the force of the water as the vessel rises and falls, substantially as specified.

2. The combination, with a vessel or boat, A, of a central vertical shaft, C, extending below the boat and provided with rotating hinged blades or wings, as and for the purpose set forth.

3. The combination, with the vessel A, of the shaft C and open cylinder B, as and for the purpose set forth.

4. The combination, with the vessel A, of a central shaft extending above and below the vessel and provided on each extension with hinged sectoral blades, as and for the purpose set forth.

5. The combination, with a vessel, A, of an electrical apparatus, $e$, actuated by the rotating shaft C′, provided with the sectoral blades, substantially as and for the purpose set forth.

In testimony whereof I have signed my name to this specification in the presence of two subscribing witnesses.

DAVID GREENE HASKINS.

Witnesses:
    J. H. ADAMS,
    P. HORGAN.